(12) United States Patent
Markert

(10) Patent No.: US 10,525,778 B2
(45) Date of Patent: Jan. 7, 2020

(54) FASTENING APPARATUS FOR FASTENING A MEASURING SENSOR, IN PARTICULAR A TIRE PRESSURE SENSOR, AND A METHOD FOR MOUNTING A MEASURING SENSOR

(71) Applicant: ALLIGATOR VENTILFABRIK GMBH, Giengen (DE)

(72) Inventor: Christian Markert, Herbrechtingen (DE)

(73) Assignee: ALLIGATOR VENTILFABRIK GMBH, Giengen (DE)

( * ) Notice: Subject to any disclaimer, the term of this patent is extended or adjusted under 35 U.S.C. 154(b) by 0 days.

(21) Appl. No.: 15/663,339

(22) Filed: Jul. 28, 2017

(65) Prior Publication Data

US 2018/0029427 A1 Feb. 1, 2018

(30) Foreign Application Priority Data

Jul. 29, 2016 (DE) .................. 10 2016 214 092

(51) Int. Cl.
| | |
|---|---|
| *B60C 23/04* | (2006.01) |
| *B60C 9/18* | (2006.01) |
| *B60C 9/20* | (2006.01) |

(52) U.S. Cl.
CPC ............... *B60C 23/04* (2013.01); *B60C 9/18* (2013.01); *B60C 23/0498* (2013.01); *B60C 2009/1828* (2013.01); *B60C 2009/209* (2013.01)

(58) Field of Classification Search
CPC .................................................. B60C 23/04
See application file for complete search history.

(56) References Cited

U.S. PATENT DOCUMENTS

| | | | |
|---|---|---|---|
| 4,105,482 A | 8/1978 | Wapelhorst et al. | |
| 4,168,197 A * | 9/1979 | Michimae | A41F 9/00 156/182 |
| 5,798,689 A | 8/1998 | Huang | |
| 5,844,131 A | 12/1998 | Gabelmann et al. | |
| 6,631,637 B2 | 10/2003 | Losey | |
| 7,217,709 B2 | 9/2007 | Miller et al. | |
| 2001/0015249 A1 | 8/2001 | Mohr | |
| 2005/0242937 A1 | 11/2005 | Yokoi et al. | |

(Continued)

FOREIGN PATENT DOCUMENTS

| | | |
|---|---|---|
| DE | 24 20 220 | 11/1975 |
| DE | 93 12 731 | 12/1993 |

(Continued)

OTHER PUBLICATIONS

Office Action dated Feb. 3, 2017 in corresponding German Application No. 10 2016 214 092.2.

*Primary Examiner* — Joseph H Feild
*Assistant Examiner* — Pameshanand Mahase
(74) *Attorney, Agent, or Firm* — Faegre Baker Daniels LLP

(57) ABSTRACT

The invention relates to a fastening apparatus for fastening a measuring sensor such as a tire pressure sensor within a tire cavity on a vehicle rim, in particular a utility vehicle rim, comprising a band-shaped tensioning belt which carries a receiving device for the measuring sensor. The fastening apparatus according to the invention is characterized in that the tensioning belt is produced from a material shrinking with the supply of heat, such that the tensioning belt shortens its length under heat supply.

20 Claims, 1 Drawing Sheet

(56) References Cited

U.S. PATENT DOCUMENTS

| | | | |
|---|---|---|---|
| 2006/0113016 A1* | 6/2006 | Cron | B60C 7/18 152/11 |
| 2008/0230313 A1* | 9/2008 | Botti | A62B 1/16 182/70 |
| 2009/0011275 A1* | 1/2009 | Nishimura | B32B 15/012 428/639 |
| 2014/0059811 A1* | 3/2014 | Accola | B65D 25/205 24/305 |
| 2016/0229238 A1* | 8/2016 | Schwammlein | B60C 23/0498 |

FOREIGN PATENT DOCUMENTS

| | | |
|---|---|---|
| DE | 94 11 270 | 10/1994 |
| DE | 195 29 289 | 2/1997 |
| DE | 100 07 375 | 1/2002 |
| DE | 602 04 862 | 12/2005 |
| DE | 10 2006 038 059 | 6/2007 |
| DE | 10 2010 037 597 | 3/2012 |
| DE | 10 2013 221 225 | 4/2015 |
| EP | 0 751 017 | 1/1997 |
| WO | 2015/055479 | 4/2015 |

\* cited by examiner

FASTENING APPARATUS FOR FASTENING A MEASURING SENSOR, IN PARTICULAR A TIRE PRESSURE SENSOR, AND A METHOD FOR MOUNTING A MEASURING SENSOR

RELATED APPLICATIONS

The present application claims the benefit of priority to German Patent Application No. 1020 162 14 092.2, filed with the German Patent Office on Jul. 29, 2016, the entire disclosure of which is expressly incorporated herein by reference.

The present invention relates to a fastening apparatus for fastening a measuring sensor, in particular a tire pressure sensor within a tire cavity according to the preamble of claim 1, and a method for mounting a measuring sensor on a vehicle rim.

Tire pressure sensors are mounted within the tire cavity on the tire or on a vehicle rim in order to detect the air pressure in the tire or tire cavity continuously or in intervals during operation of the vehicle. The air pressure detected by the tire pressure sensor is transmitted to a receiver in the vehicle and evaluated by means of a transmitting device integrated in the tire pressure sensor so that a warning message can be output in the case of an impermissible pressure drop.

Conventionally, a corresponding tire pressure sensor is fastened to the rim either by a mechanical, advantageously articulated, connection of the tire pressure sensor at the inner end of the tire valve. It is disadvantageous that special constructions of the valves are necessary for this purpose and, owing to the positioning outside the so-called deep-bed of the rim, there is a likelihood that the tire pressure sensor is damaged when the tire is removed from or pulled up onto the rim. An example of such a tire pressure sensor attached to the tire valve is disclosed in EP 0 751 017 A2.

DE 10 2006 038 059 A9 describes the attachment of a tire pressure sensor to a motor vehicle rim by means of an adhesive strip. For this purpose, a base is glued from the outside in the deep bed of the rim by means of the adhesive strip. The tire pressure sensor can then be attached to the base. For securing purposes, a lashing strap can be passed over the rim through the base, which is closed with a belt buckle, which can be designed as a disposable or reusable article, over the circumference of the rim. As a buckle, for example, a crimp lock or a countersunk lock or also a worm gear lock can be considered. The adhesive strip is generally a double-sided adhesive tape. Thus, the primary attachment of the tire pressure sensor is performed by the adhesive tape, which reliably prevents the tire pressure sensor from shifting on the rim. Strong centrifugal forces which could detach the base from the adhesive tape or the adhesive tape from the rim are compensated by the belt.

An approach that deviates therefrom is described in DE 10 2010 037 597 A1. According to the fastening apparatus shown there for fastening a tire module, in particular an air pressure sensor, for tires, it is to be avoided that the tire module rests against the vehicle rim. Rather, the tire module is intended to position freely inside the tire cavity in order to improve the quality of the measured temperature of the air in the tire cavity, in that the measured temperature is not influenced by the temperature of the vehicle rim. The module is to be decoupled thermally from both the tire and the vehicle rim. For this purpose, starting from approaches in which the tire module is arranged without attachment in the tire cavity, it is proposed to arrange the tire module in a freely movable manner on a band-like holding means, wherein the band-like holding means is arranged substantially coaxially on the vehicle rim in the tire cavity, as a result of which the vehicle tire, during rotation of the vehicle tire, is spaced from the tire inner side and from the outer circumferential side of the vehicle rim. Accordingly, the tire module is neither attached to the rim nor to the inside of the tire, e.g. by means of a corresponding adhesive process. The band-like holding means is loosely looped around the vehicle rim and loosely attached thereto. In order to achieve an abrasion-resistant, high-strength, temperature-resistant and air-permeable holding means, this can consist of a synthetic fiber material. The opposite ends of the band-like holding means can be connected by a Velcro fastener during assembly on the vehicle rim, and the tire module can be arranged in a closable pocket on the band-like holding means.

US 2005/0242937 A1 discloses a rubber band or a rubber ring for fixing a measuring sensor.

U.S. Pat. No. 5,798,689 describes an elastic band for fastening a tire pressure sensor, wherein the belt is closed with hooks.

DE 100 07 375 C2 relates to a rim tube of textile thread material for fastening a sound-absorbing body. The sound-absorbing body is thereby formed by the tube itself.

DE 94 11 270 U1 discloses a kit for fastening, guiding and fixing objects, preferably of electrical conductors with a shrinkable plastic tape.

DE 93 12 731 U1 discloses a shrink tube.

For further prior art, we refer to DE 195 29 289 A1, DE 10 2013 221 225 A1 and DE 602 04 862 T2.

The present invention relates exclusively to a fastening apparatus for fastening a measuring pressure sensor within a tire cavity to a vehicle rim, in which the measuring pressure sensor, in particular the tire pressure gauge, is firmly clamped on the surface of the vehicle rim, because in the case of an optionally provided temperature measurement it is intended to also consider the rim temperature in particular. Compared with the state of the art with crimp, countersunk or worm gear belt locks and with belt straps, which are usually made of metal, wherein the primary fastening of the tire pressure sensor occurs by gluing to the rim, mounting should occur in a faster and more comfortable manner and with more protection for the rim, and especially large diameter ranges of different rims should be covered by a single fastening apparatus. At the same time, the disadvantages mentioned at the outset, which prevail in the case of attachments of tire pressure sensors on valves, are to be avoided.

It is therefore the object of the present invention to provide a fastening apparatus for fastening a measuring sensor, in particular a tire pressure sensor, within a tire cavity on a vehicle rim, which can be used universally on rims of different wheel diameters and designs, and can be used comfortably both during initial installation by vehicle manufacturers and during retrofitting in workshops. Furthermore, a mounting method for such a fastening apparatus is to be specified, with which particularly comfortable mounting is possible.

The object according to the invention is achieved by a fastening apparatus with the features of claim 1 and a method with the features of claim 11. Advantageous and particularly appropriate embodiments of the invention are specified in the dependent claims.

A fastening apparatus according to the invention for fastening a measuring sensor, in particular a tire pressure sensor within a tire cavity on a vehicle rim, in particular a utility vehicle rim, for example for a truck, comprises a band-shaped tensioning belt which carries a receiving device for the measuring sensor or tire pressure sensor. The tensioning belt and the receiving device are designed for holding and clamping the sensor on the surface of the vehicle rim in a fixed location. In particular, no further fastening apparatus such as adhesive strip or the like is required, but the sensor is held on the rim solely by the tensioning belt.

According to the invention, the tensioning belt is produced from a material shrinking under heat supply, such that the tensioning belt shortens its length under heat supply. The length in this case relates to the direction of wrapping of the band-shaped tensioning belt, which is a multiple of its width oriented perpendicularly thereto, or its thickness which is likewise oriented perpendicularly thereto. The wrapping direction is the one in which the tensioning belt is looped around the rim of the vehicle, i.e. the circumferential direction of the vehicle rim.

The material shrinking under heat supply is permanently shrunk so that the length shortening of the tensioning belt is also permanent. It is thus possible to initially loop the tensioning belt in a comparatively loose manner around the vehicle rim, in particular the utility vehicle rim, and only then to initiate the shrinkage of the material of the tensioning belt and thus the length shortening of the tensioning belt, so that the tensioning belt fits tightly to the rim from the outside.

The material of the tensioning belt preferably has a homogeneous structure at least over the width of the tensioning belt. However, the material of the entire tensioning belt can also have a homogeneous configuration. In particular, a surface weight and/or a density of the tensioning belt is constant. Accordingly, the tensioning belt, when made of a textile material, is woven, machine-knitted and/or knitted over its entire width or generally evenly or in a uniform manner, without having zones of a different structure or different composition than those provided in adjacent regions.

According to an embodiment of a corresponding mounting method according to the invention, the heat is supplied to the tensioning belt and thus the heat input into the shrinking material, which triggers the shrinkage, at least also during the operation of the vehicle rim on or in a vehicle. If, for example, the vehicle rim is heated by braking with a braking device, usually a disc brake, arranged in the area of the vehicle rim, this heat is transmitted from the vehicle rim into the tensioning belt, wherein the tensioning belt thus automatically sits even closer against the rim, i.e. it is shrunk thereon.

It is, of course, possible to initiate a shrinkage already during the mounting of the fastening apparatus or of the tensioning belt on the vehicle rim by means of heat supply, so that the tensioning belt is shrunk more or less tightly onto the rim. For example, the heat can be supplied by means of a hot-air blower or in a furnace. Also the application of an electrical voltage to the rim, in order to heat it is principally possible. Other methods of heat supply are possible, such as, for example, irradiation with infrared rays and/or microwaves.

According to an alternative embodiment, the heat supply during the mounting of the fastening apparatus or before the operation of the vehicle rim on the vehicle can be dispensed with however, and the necessary heat input for the shrinkage can be effected exclusively during the operation of the rim in or on the vehicle.

One embodiment of the method according to the invention provides that the tensioning belt is already subjected to heat during mounting of the fastening apparatus in such a way that it is subject to a final shrinkage, that is to say that later shrinkages during the operation of the rim in or on the vehicle are avoided, even if a heat input into the tensioning belt takes place over the rim in this case. This can be achieved for example in such a way that the tensioning belt is heated during mounting to a temperature which is above the temperatures occurring later during operation of the rim. In addition or alternatively, a material can be selected for the tensioning belt which shrinks principally only once in the case of a heat input or in the case of heat supply and is no longer shrinkable in the case of subsequent heat inputs.

The invention offers the advantage that the fastening apparatus or the band-shaped tensioning belt must be shrunk onto the rim immediately or at a later time only after its wrapping around the vehicle rim by the appropriate heat supply, without the need for further mounting steps. In this case, the sensor can be fastened to the tensioning belt before or after the shrinking by means of the receiving device, e.g. it can be inserted into a pocket formed by the receiving device, which can be made of the same material as the tensioning belt or of another material. If a different material is selected for the pocket than for the tensioning belt, this can be produced in particular from a non-shrinking material or from a material that does not shrink at the temperature occurring during operation of the vehicle rim. Even if the pocket is made of a shrinking and/or elastic material, the measuring sensor can be securely held in the pocket and protected from slipping out of said pocket by the shrinking of the tensioning belt and/or the shrinking of the pocket.

Particularly advantageously, the tensioning belt is produced from an elastic material so that it is elastic before and, in particular, also after its shrinkage. The elasticity of the tensioning belt before the shrinkage enables easy mounting on the rim, e.g. by the tensioning belt being set into the rim bed by elastic expansion over the rim edge. The elasticity provided according to one embodiment after the shrinkage allows for compensation of changes in the diameter of the rim during its operation by thermal expansion.

In particular, if the tensioning belt is elastic, it can be designed as an endless belt and can thus do without any closure. As a result, particularly cost-effective manufacture and particularly fast mounting are possible. Alternatively, however, it is also possible to design the tensioning belt as a belt with two ends which can be fastened to each other, in particular by means of a corresponding one- or two-part fastener at one or both ends. In principle, it is also conceivable to assemble the tensioning belt from a plurality of sections arranged successively one behind the other and which are detachably connected to one another.

The tensioning belt is advantageously made of a textile material, for example by weaving or machine-knitting. However, other production methods, for example knitting, felting or others, can also be considered.

The tensioning belt is in particular made of a material which shrinks at 150° C. or less, in particular at 120° or less, particularly advantageously at 80° or less. The shrinkage rate, i.e. the percentage length shortening of the tensioning belt, is in particular 1 percent or more, advantageously 3 percent or more, especially already at 80° C. In particular, the shrinkage rate is 5 percent or more, advantageously at least 8 percent at a shrinkage temperature of 150° C. Furthermore, materials may be provided which are subject to even greater shrinkage.

The invention will be described below by way of example with reference to an exemplary embodiment and the drawings, wherein.

Figure 1:
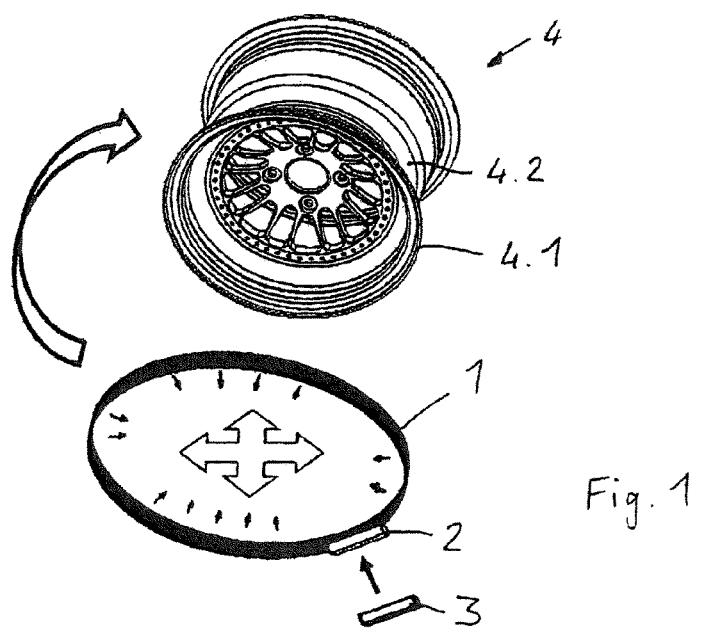
FIG. 1 shows an exemplary embodiment of a fastening apparatus according to the invention for fastening a measuring sensor to a vehicle rim.

FIG. 1 shows a tensioning belt 1 made of a material shrinking under heat supply, which has a receiving device 2 for a measuring sensor 3, for example in the form of a tire pressure sensor and/or tire temperature sensor.

The tensioning belt 1 is in particular made of an elastic material so that it can be pulled apart, thereby increasing its length and its circumference. This is illustrated by the quadruple arrow. However, the elasticity is not compelling if the tensioning belt 1, which is embodied here as an endless belt, has a larger diameter than the rim edge 4.1 before it is applied to the illustrated rim 4, more precisely over its rim edge 4.1 into the rim bed 4.2.

For fastening the measuring sensor 3 to the rim 4 or its rim bed 4.2, the tensioning belt 1 is appropriately looped around the rim 4 from the outside, and the tensioning belt 1 is then shrunk under heat supply. This is illustrated by the many small arrows in the tensioning belt 1. The heat shrinkage reduces the length of the tensioning belt 1 and thus the diameter of the tensioning belt 1 so that the tensioning belt 1 engages tightly from the outside against the rim 4 or the rim bed 4.2. The fastening of the measuring sensor 3 in the receiving device 2 can thereby be effected before the rim 4 is looped with the tensioning belt 1 and/or before the shrinking of the tensioning belt 1 by heat supply. Furthermore, it is in particular possible to replace a measurement sensor 3 inserted into or attached to the receiving device 2 against another measuring sensor 3 after the tensioning belt 1 has been shrunk onto the rim 4.

Figure 2:
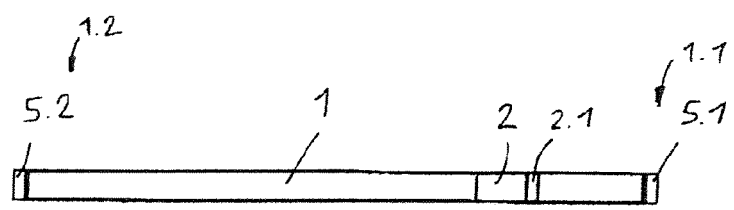
FIG. 2 shows an alternative embodiment according to the invention.

An alternative embodiment for a tensioning belt 1 is shown in FIG. 2. In this case, the tensioning belt 1 is not designed as an endless belt but a band with two ends 1.1 and 1.2, which can be fastened together, for example by means of the two closure halves 5.1 and 5.2. The fastening can be detachable or non-detachable. Various configurations are possible.

Apart from that, the same applies as stated with regard to the embodiment according to FIG. 1.

FIG. 2 shows by way of example a receiving device 2 in the form of a pocket with an insertion opening 2.1. This pocket is made, for example, from the same material, in particular a textile material, as the tensioning belt 1. Such a pocket could also be provided in the embodiment according to FIG. 1. However, any other configurations are possible.

If the receiving device 2 is designed as a pocket, this can be tensioned by the shrinking of the tensioning belt 1 or by shrinking its own material around the measuring sensor 3 so that it is captively held in the pocket 2.

The invention claimed is:

1. A fastening apparatus for fastening a measuring sensor within a tire cavity on a vehicle rim, in particular a utility vehicle rim, comprising:
   a band-shaped tensioning belt which carries a receiving device for the measuring sensor, the band-shaped tensioning belt having a length measured along a longitudinal axis of the band-shaped tensioning belt, the length arrangeable to be looped in a circumferential direction around the vehicle rim;
   wherein
   the tensioning belt is produced from a material shrinking under heat supply in such a way that the tensioning belt shortens its length under heat supply along the longitudinal axis of the band-shaped tensioning belt and, when looped around the vehicle rim, along the circumferential direction.

2. A fastening apparatus according to claim 1, wherein the tensioning belt is designed as an endless belt.

3. A fastening apparatus according to claim 2, wherein the tensioning belt is made of a textile material.

4. A fastening apparatus according to claim 2, wherein the tensioning belt is elastic at least before shrinkage by heat supply.

5. A fastening apparatus according to claim 1, wherein the tensioning belt has two opposite ends which can be connected to one another.

6. A fastening apparatus according to claim 5, wherein the tensioning belt is made of a textile material.

7. A fastening apparatus according to claim 5, wherein the tensioning belt is elastic at least before shrinkage by heat supply.

8. A fastening apparatus according to claim 1, wherein the tensioning belt is made of a textile material.

9. A fastening apparatus according to claim 8, wherein the tensioning belt is woven or knitted.

10. A fastening apparatus according to claim 1, wherein the tensioning belt is elastic at least before shrinkage by heat supply.

11. A fastening apparatus according to claim 10, wherein the tensioning belt is also elastic after the shrinkage by heat supply.

12. A fastening apparatus according to claim 1, wherein the tensioning belt is made of a material which shrinks at 150° C. or less.

13. A fastening apparatus according to claim 12, wherein the shrinkage rate of the tensioning belt is 1% or more, at 150° C.

14. A fastening apparatus according to claim 1, wherein the tensioning belt (1) has a homogeneous structure, in particular at a constant density and/or a constant surface weight, at least over its width which runs perpendicularly to its length.

15. A method for mounting a measuring sensor such as tire pressure sensor within a tire cavity on a vehicle rim (4), in particular a utility vehicle rim, wherein:
   looping the vehicle rim (4) with a fastening apparatus according to claim 1;
   subsequent shrinking of the tensioning belt by heat supply.

16. A method according to claim 15, wherein the tensioning belt is shrunk by heat supply during the operation of the vehicle rim on a vehicle.

17. A method according to claim 16, wherein the tensioning belt is shrunk only on the basis of a heat supply during the operation of the vehicle rim on a vehicle.

18. A method according to claim 15, wherein the tensioning belt is permanently shrunk by the heat supply.

19. A method according to claim 15, wherein the tensioning belt, after being mounted on the vehicle rim, is brought before an operation of the vehicle rim on a vehicle to a temperature which triggers a shrinkage of the tensioning belt and prevents later shrinkage.

20. A fastening apparatus according to claim 1, wherein the tensioning belt is produced from a material permanently shrinking under heat supply.

* * * * *